(12) United States Patent

Millard et al.

(10) Patent No.: US 7,854,969 B2
(45) Date of Patent: Dec. 21, 2010

(54) METHOD FOR FABRICATING INTEGRAL COMPOSITE STRUCTURAL MATERIAL

(75) Inventors: Michael Lee Millard, Cincinnati, OH (US); Horace Richardson, Jr., Cincinnati, OH (US); Joseph Anthony Corrado, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 69 days.

(21) Appl. No.: 11/618,062

(22) Filed: Dec. 29, 2006

(65) Prior Publication Data

US 2007/0246149 A1    Oct. 25, 2007

Related U.S. Application Data

(62) Division of application No. 10/703,271, filed on Nov. 7, 2003, now Pat. No. 7,282,274.

(51) Int. Cl.
    *C23C 4/10*     (2006.01)
    *C04B 37/00*    (2006.01)
    *C04B 37/02*    (2006.01)
    *C04B 37/04*    (2006.01)
(52) U.S. Cl. .................. 427/453; 156/89.11; 156/89.28
(58) Field of Classification Search .................. 427/453
    See application file for complete search history.

(56) References Cited

U.S. PATENT DOCUMENTS 3,444,925 A *  5/1969  Johnson ...................... 165/166
4,059,712 A * 11/1977  Bothwell .................... 428/34.6
4,559,248 A * 12/1985  Sumiyoshi et al. ............. 442/5
4,572,754 A *  2/1986  Bloom ...................... 156/89.18
4,619,553 A * 10/1986  Fischer ......................... 405/63
4,991,697 A *  2/1991  Hummel et al. ......... 188/250 B
5,601,674 A *  2/1997  Szweda et al. ........... 156/89.11
2003/0059577 A1* 3/2003  Morrison et al. ............ 428/166

* cited by examiner

*Primary Examiner*—Katherine A Bareford
(74) *Attorney, Agent, or Firm*—McNees Wallace & Nurick LLC

(57) ABSTRACT

The present invention is an integral composite structural (ICS) material comprising an open metal structure having at least one external side and internal surfaces defining a plurality of open shapes with a ceramic matrix composite bonded to at least one external side and the surfaces of at least a substantial portion of the plurality of open shapes and occupying at least a substantial portion of the plurality of open shapes. The open metal structure, independent of the ceramic matrix composite, has a total metal volume percent in the range of about 10% to about 90%, with no dimension of any open shape being greater than about ¾ inch. The ceramic matrix layer covers a substantial portion of at least one external side of the open metal structure. At least one external side of the metal portion of the ICS material is bonded with a ceramic matrix composite such that the ceramic layer occupies at least a significant portion of the open pores of the metal portion and is bonded to a significant portion of at least one external side of the metal element. The present invention is also a method of manufacturing such an ICS material.

9 Claims, 2 Drawing Sheets

METHOD FOR FABRICATING INTEGRAL COMPOSITE STRUCTURAL MATERIAL

CROSS-REFERENCE TO RELATED APPLICATIONS

This application is a divisional of U.S. Utility application Ser. No. 10/703,271, filed on Nov. 7, 2003, and entitled "Method for Fabricating Integral Composite Structural Material", now U.S. Pat. No. 7,282,274, the disclosure of which is incorporated as if fully rewritten herein.

FIELD OF THE INVENTION

The present invention relates generally to composite materials, and more particularly, to an integral composite structural material and method for making an integral composite structural material.

BACKGROUND OF THE INVENTION

Currently engine components, in most instances, are fabricated with metallic materials with some substitution of ceramics or ceramic matrix composite materials (CMC's). Metallic materials, particularly iron-based, cobalt-based, and nickel-based superalloys have high strengths and good elastic moduli, which lead to excellent strain capabilities and damage tolerances within their useful temperature regime. The useful temperature regime for a superalloy changes with composition. Additionally, engine environments as well as operational and structural requirements further define the useful temperature regime for a superalloy. At high temperatures, or temperatures above the superalloy's useful temperature regime, the metal material begins to exhibit significantly reduced elastic moduli. These metallic materials lose their structural capabilities as they either oxidize or exhibit more plastic-like behavior. In addition, metallic materials are relatively dense in comparison to other materials such as ceramics or CMC's.

Uncooled engine components in and aft of the combustor can reach temperatures in excess of 3000° F. (1650° C.), which is significantly above the temperature where iron-based, cobalt-based and/or nickel-based superalloys can be used. Cooling passages are generally incorporated within the materials to reduce the bulk temperature of these components. In addition, ceramic thermal barrier coatings are applied to the surface of such metallic components in order to enhance the temperature capabilities or structural performance of such components.

Use of ceramics and/or ceramic composite materials in the form of high temperature operating articles, such as components for power generating apparatus including automotive engines, gas turbines, etc., is attractive based on the light weight and strength at high temperatures of certain ceramics. However, monolithic ceramic structures, without reinforcement, are brittle. Without assistance from additional incorporated, reinforcing structures, such members may not meet reliability requirements for such strenuous use. In an attempt to overcome that deficiency, certain fracture resistant ceramic matrix composites have been created. These ceramic matrix composite materials have incorporated fibers of various size and types, for example long fibers or filaments, short or chopped fibers, whiskers, fibers arranged unidirectionally, fibers oriented in two directions (woven) etc. All of these types are referred to for simplicity herein as "fibers". Some fibers have been coated, for example with carbon, boron nitride, or other materials, applied to prevent adverse reactions from occurring at the interface between the reinforcement fiber and matrix. Inclusion of such fibers within the ceramic matrix was made to improve brittle fracture behavior of the material.

U.S. Pat. Nos. 5,488,017 and 5,601,674, which are assigned to the Assignee of the present invention, and which are incorporated herein by reference, describe an environmentally stable, fiber reinforced ceramic matrix composite member comprising oxidation stable reinforcing fibers, for example ceramic fibers, and a matrix interspersed about the fibers, which are known in the art. As used herein, "oxidation stable" in respect to fibers means fibers that substantially will not experience substantial oxidation and/or environmental degradation, at intended operating conditions of temperature and atmosphere, such as air. The matrix is a mixture including ceramic particles bonded together with a ceramic phase. The ceramic particles and the ceramic may be the same material, or different materials.

In the manufacture of such oxidation stable ceramic matrix composite materials, a slurry comprising a polymer substance, which transforms upon heating to yield a ceramic phase, and ceramic particles, are mixed in a liquid vehicle to form a substantially uniform distribution in a matrix mixture slurry. This slurry is interspersed about the oxidation stable fibers, as a matrix mixture, to provide an element, which is pre-impregnated with a matrix precursor, otherwise known as a "prepreg" element. Such a prepreg element (or a plurality of prepreg elements) is molded under the influence of heat and pressure to form a prepreg preform, which is a polymer matrix composite precursor member that is readily handled. The preform is subsequently heated in an oxidizing atmosphere, such as air, at a second processing temperature, at least at the temperature required to transform the polymer substance to a ceramic phase and less than that which will result in degradation of ceramic fibers in the preform. Such temperature can be in the range of about 600° C. to about 1400° C., (1100° F.-2550° F.) depending on the nature of the reinforcing fibers. Such heating transforms the polymer substance, such as by decomposition, to a ceramic phase, which bonds together the ceramic particles from the slurry into a ceramic matrix about the fibers. Because components of this reinforced, ceramic matrix composite member are stabilized in an oxidizing atmosphere, preferably being substantially all ceramic oxides bonded together, the member is environmentally stable. Because the matrix contains a controlled amount of porosity, which effectively controls the strength of the matrix and the strength of the bond between the reinforcing fibers and the matrix, the member exhibits both high strength and high resistance to fracture. Further background on the use of consolidation shrinkable discontinuous shrinkable material is found in U.S. Pat. No. 5,306,554, assigned to the Assignee of the present invention and which is incorporated herein by reference.

Such ceramic matrix composite materials are lightweight in comparison to metal alloys and do not exhibit environmental degradation at high temperatures, especially oxide-based ceramic or ceramic composite materials. However, such materials are still prone to reliability issues in environments such as power generating turbine engines because of their relatively low strain-to-failure ratios compared to metallic materials. In addition, oxide-based ceramic composite materials do not exhibit good thermal shock resistance due to their rather high thermal expansions and low thermal conductivities coupled with their relatively low strain-to-failure. Without good thermal shock such ceramic composite materials do not possess the reliability requirements for strenuous use in power generating equipment such as turbine engines.

One method of overcoming this problem has been to combine metals and ceramics into an integral composite material. However, no method currently exists to overcome the chemical and physical difference between metallic and ceramic matrix materials so that the two types of materials can be combined together without exhibiting stress cracking caused by the differences in thermal expansion between the two materials, which are promoted by rapid temperatures changes inherent in a turbine engine.

Problems with joining ceramic materials to metal materials are well-known in the art. As discussed in U.S. Pat. No. 4,338,380 to Erickson, et al., direct joining of ceramic materials to metallic materials has been limited to materials having small differences in coefficient of thermal expansions, unless an intermediate, compliant material is placed between the metal and ceramic materials.

Macrocomposite metal matrix materials, or materials comprising metal matrix composite materials bonded to a second material, such as ceramic or ceramic composite bodies, are also known in the art as set forth in U.S. Pat. No. 5,618,635. However, such macrocomposite materials have only been directed to metal matrix materials, in which a metal, such as aluminum, is infiltrated into a ceramic filler material or preform.

What is needed is a reliable, environmentally stable, lightweight structural material, which is resistant to the high temperatures that are present in engines, motors and generators. The material in such components should have the reliability, thermal and structural properties of metals in their useful temperature regime with the environmental and mechanical performance stability of ceramic matrix composites at elevated temperatures, particularly for turbine engine components where temperatures are sufficiently high that both metals and ceramics are required at the interface between the metals and the ceramic composites. In addition, such a lightweight structural material should be able to be manufactured into engine components that can be readily attached to other engine components using mechanical fastening techniques, such as bolts and the like.

SUMMARY OF THE INVENTION

The present invention provides a novel processing step for the production of an integral structural composite (ICS) material that comprises both metal and ceramic components and a method of manufacturing such an integral composite material.

The ICS material of the present invention is manufactured through the use of a series of processing steps. First, a metal structure with open geometric shapes punched or formed in the structure is provided. The open metal structure has from about 10 volume percent metal to about 90 volume percent metal. Examples of the open metal structure include, but are not limited to were arranged such as in, wire mesh, perforated metal with apertures selected from the group consisting of circular apertures, triangular apertures, rectangular apertures other multidimensional-formed apertures, and combinations thereof, and expanded metal performs in a variety of shapes. A ceramic precursor material containing ceramic fibers and a ceramic matrix consisting of ceramic powder material and binders, such as a ply of non-directional prepregged ceramic composite material, is provided and then placed in contact with at least one side of the open metal structure such that the ply covers at least a substantial amount of the at least one external side of the open metal structure. The ceramic precursor material is then laminated against the at least one external side of the open metal structure so that the ceramic precursor material enters the open pores within the metal structure and contacts at least a portion of the inner surfaces of the open metal structure. The metal and ceramic structure material is then sintered to 1110° F. (600° C.) to 2010° F. (1100° C.) in an oxidative environment to form a metal oxide layer on the at least one external surface of the open metal structure and any inner surfaces of the open metal structure which are in contact with the ceramic precursor material, so that ceramic material which is converted from the ceramic precursor material bonds to the metal oxide. During the sintering process, at least one side of the open metal structure to which the ceramic precursor material has been laminated must form a sufficient amount of metal oxide so that the ceramic produced by the ceramic precursor material chemically bonds to the metal oxide. An erosion coat may be applied to the surface of the ceramic matrix composite layer.

The ICS material of the present invention comprises an open metal structure having at least one external side and internal surfaces defining a plurality of open shapes with a ceramic matrix composite bonded to at least one external side and the surfaces of at least a substantial portion of the plurality of open shapes and occupying at least a substantial portion of the plurality of open shapes. The open metal structure, independent of the ceramic matrix composite, has a total metal volume percent in the range of about 10% to about 90%, with no dimension of any open shape being greater than about ¾ inch. The ceramic matrix layer covers a substantial portion of at least one external side of the open metal structure. At least one external side of the metal portion of the ICS material is bonded with a ceramic matrix composite such that the ceramic layer occupies at least a significant portion of the open pores of the metal portion and is bonded to a significant portion of at least one external side of the metal element.

The ICS material of the present invention maintains the best properties of both its constituents, namely metal and ceramic matrix composites, while each constituent serves to offset the properties that limit their capabilities or usage in high temperature environments with significant thermal cycling and stress. The metal portion provides excellent strength within its useful temperature regime along with excellent thermal cycling capabilities and better strain resistance at higher temperatures, when compared to components consisting solely of ceramic materials. The ceramic portion provides excellent strength at higher temperatures, when compared to components comprising solely of metal elements, and provides environmental or over-temperature protection to the metal. The metal element also provides crack arresting capabilities to the ceramic element of the ICS material, which increases reliability. Additionally, the metal element gives the ICS material good strain capabilities as well as excellent thermal cycling resistance performance especially when compared to materials consisting solely of ceramic matrix composite materials. The ceramic matrix composite that is bonded to at least one external side of the open metal structure provides environmental or over-temperature protection to at least one external side of the metal element.

An advantage of the present invention is that the ICS material provides good strength at both low and high temperatures.

Another advantage of the present invention is that the ICS material provides good resistance to thermal cycling.

Another advantage of the present invention is that the ICS material can be mechanically attached to other ICS and/or metal components, through the use of bolts and/or spacers, and welded to other ICS and/or metal components.

Another advantage of the present inventions is that the ICS material is a better substrate for ceramic coatings and thermal barrier coatings since the chemical and physical properties of such coatings are more similar to the ICS material than are substrates comprising solely metal.

Another advantage of the present invention is that cooling can be introduced within the open metal structure by using metal tubes instead of solid metal wire in the wire mesh open metal structure or by incorporating open channels inside the metal for the perforated metal structure, attaching the open metal structure to a manifold, and then flowing air or other suitable coolant through the inside of the open metal structure.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
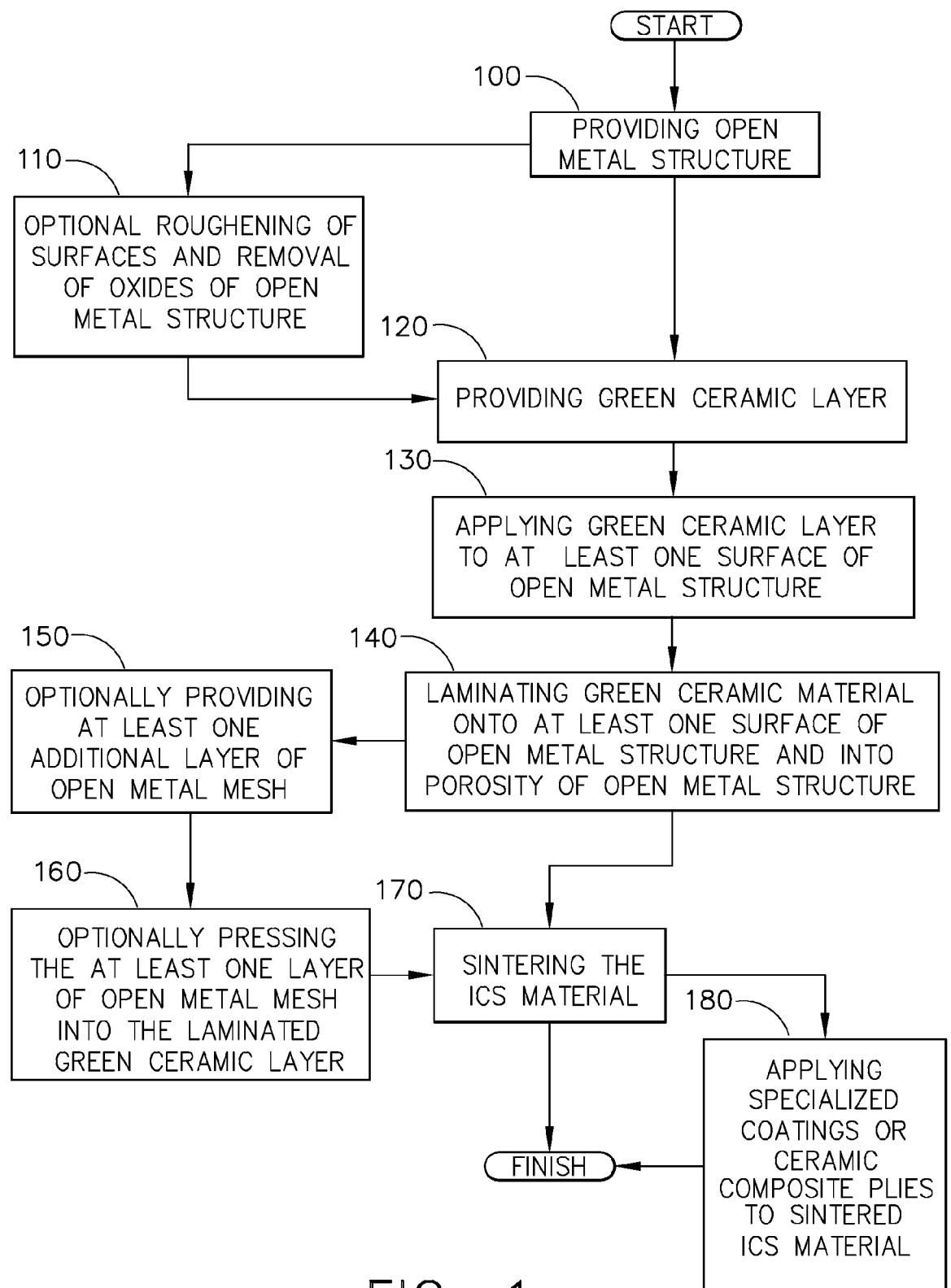
FIG. 1 is a process flow chart illustrating the method of creating the ICS material of the present invention.

Referring now to FIG. 1, there is shown a flow chart of the method of manufacturing the ICS material of the present invention. The first step 100 of the present invention is the provision an open metal (or metal alloy) structure having at least one external side and inner surfaces which define a plurality of open shapes, with total metal volume percent in the range of about 10% to about 90%, each open shape having no dimension that is greater than about ¾ inch. The open shapes of the open metal structure must be open so that the shapes extend the entire way through the metal cross-section, such that the metal has continuous inner surfaces that define the shapes. The metal may be aluminum, carbon steel, HSLA steel, stainless steel or iron-based, cobalt-based, or nickel-based superalloys, or combinations thereof. The open metal structure may be in the form of a perforated sheet, wire mesh, expanded metal or combinations thereof. If wire mesh is used for the open metal structure, the size of such open metal structure can range from wire having a diameter of about 0.006 inch for high density mesh screens such as those in the range of about 16 mesh to about 30 mesh to wire having a diameter of about 0.080 inch for lower density meshes as those in the range of about 2 to about 6 mesh. As used herein the term "mesh" refers to U.S. Sieve sizes. The wire can have a solid cross-section if the ICS material is used for purely structural applications or tubular if used for cooling and structural application if a means for cooling is incorporated within the structure. In a preferred embodiment, the open metal structure is a perforated sheet with a total metal volume percent of about 30% to about 80%. In another preferred embodiment, the open metal structure is an expanded metal sheet with a total metal volume percent of about 10% to about 50%. The open metal structure may be pre-oxidized to facilitate bonding between the ceramic precursor material and the open metal structure.

The next optional step of the process 110 is roughening the surface and/or removing any residual surface oxides of the at least one external side of the open metal structure and the inner surfaces of the open metal structure which define the shapes of the open metal structure under the at least one external side where the ceramic matrix composite is to be formed in order to facilitate the formation of an metal oxide layer on such surfaces during the step of sintering 170. Such metal oxide layers permit the ceramic matrix composite to bond to the open metal structure during the step of sintering 170. Preferably such roughening and/or residual surface oxide removal would be performed using sand blasting, pickling or shot peen as known in the art.

The next step of the process 120, is providing a layer, or a plurality of layers, of ceramic matrix composite precursor material, referred to herein as "green ceramic" which can be sintered into a ceramic matrix composite material. The precursor material is referred to as "green" since it is relatively flexible, as opposed to ceramic matrix composite material, which is rather brittle. Such a green ceramic precursor layer can be a ply or a plurality of plies of prepregged non-directional ceramic precursor, which is referred to herein as "prepreg ceramic paper". The prepreg ceramic paper is produced by infiltrating a ceramic paper with a ceramic slurry. The ceramic paper is a thin sheet of non-oriented chopped fibers comprising fibers selected from the group consisting of oxide fibers, silicon carbide fibers, glass fibers, and combinations thereof. The oxide fibers may be, but are not limited to, proprietary fibers such as NEXTEL® 312 ceramic fibers or NEXTEL® 610 ceramic fibers, which are well-known to those skilled in the art. NEXTEL® is a registered trademark of 3M of St. Paul, Minn. The silicon carbide fibers may be, but are not limited to, proprietary fibers, such as TYRANNO FIBER® silicon carbide fibers. TYRANNO FIBER® is a registered trademark of UBE Industries, Ltd. of Japan. The ceramic slurry comprises ceramic particles and plastic-like ceramic precursors. The slurry is deposited into the paper at a prior time, as is well known in the art. Typical of the ceramic particles used for ceramic matrices are the oxides of elements selected from the group consisting of Al, Si, Hf, Y, Zr, and combinations thereof. Such oxides include alumina, silica, $ZrO_2$ (zirconia), $HfO_2$ (hafnia), $3Al_2O_3.2SiO_2$ (mullite), $Y_2O_3$ (yttria), $CaO.Al_2O_3$ (calcia aluminate), various clays and combinations thereof Such ceramic particle sizes are usually in the sub-micron range for tightly woven fibers but the particle size may be larger for more loosely constructed ceramic papers or cloths. Typical of a ceramic matrix precursor materials are vinylic polysilane, dimethyl siloxane, polycarbosilanes, silicones and tetra ethyl ortho silicate, which transforms into silica upon sintering, hafnium oxychloride, which transforms into hafnia upon sintering, mono aluminum phosphate, which transforms into aluminum phosphate upon sintering, and aluminum isopropoxide, which transforms into alumina upon sintering along with other precursors that are known in the art. In a preferred embodiment, the green ceramic layer is a stacked plurality of plies of NEXTEL® 610 ceramic paper, which comprises non-directional alumina fibers having a diameter in the range of about 10 µm to about 12 µm prepregged with slurry containing sub-micron $Al_2O_3$ particles, a silica-yielding precursor, and solvents which dissolve the precursor and control the viscosity of the slurry so that the slurry can infiltrate the ceramic paper. The solvents used will depend upon the silica precursor actually selected, but only silica precursor may be used.

The next step of the process 130 is applying the green ceramic layer to the surface of at least one external side of the open metal structure. The green ceramic layer is pressed onto at least one external side of the open metal structure and into the open shapes of the open metal structure under the green ceramic layer by any convenient method. The green ceramic layer may be pressed into at least one external side of the open metal structure by hand, by using a rolling press, by mechanical pressing or by autoclaving. The green ceramic layer may be placed over the entire at least one external side of the open metal structure or a substantial portion of the at least one external side of the open metal structure. In a preferred embodiment, a plurality of plies of green ceramic are stacked together and pressed into the entire surface of two opposing external sides of the open metal structure. The number of plies is dependent upon the weight of the ceramic paper and the thickness and open shape volume of the open metal structure. This dependency exists because the basic objective of fabricating an ICS is to push enough ceramic prepreg into the open volume of the open metal structure to completely fill the openings and cover the open metal structure. Higher weight ceramic papers yield a thicker ceramic prepreg ply, which results in higher ceramic prepreg volumes per ply. Therefore, a lower number of heavier ceramic weight papers are required than lighter ceramic weight papers if the open metal structure remains the same.

The next step of the process 140 is laminating the green ceramic layer onto at least one external side of the open metal structure and into the open pores of the open metal structure beneath the green ceramic layer to form an ICS precursor material. Such lamination of a green ceramic layer is well known in the art. In a preferred embodiment, the lamination is performed at a pressure of about 50 psi to about 600 psi and stabilized at a temperature of about 300° F. (150° C.).

The optional next step of the process 150 is providing at least one additional layer of open metal screen or a thin perforated metal sheet to be pressed or bonded into the green ceramic layer. The wire thickness of the optional metal screen or perforated metal sheet must be sufficiently thin so that the expansion of the optional metal screen or perforated metal sheet, with respect in the ceramic layer and underlying open metal layer does not cause cracks or tears to appear in the ICS material during sintering or thermally cycling at higher temperatures. This optional open metallic structure may comprise aluminum, carbon steel, high strength low alloy (HSLA) steels, stainless steels, or iron-based, cobalt-based, or nickel-based superalloys, or combinations thereof. The perforated metal sheet is usually produced from softer metals such as soft steels or aluminum. If wire screen is used for the optional metal screen, the size of such wire screen can have wire diameter in the range of about 0.006 inch to about 0.010 inch with a screen size of about 16 mesh to about 30 mesh. If perforated metal sheet is used for the optional metal screen, the volume percent metal should be low and range from about 10% to about 30%. As with the open metal structure provided in step 100, the open metal screen has at least one external side and inner surfaces that define a plurality of open shapes. The apertures of the open metal screen must be open so that the shapes extend the entire way through the metal, but the metal must be continuous so that its surfaces clearly define the aperture shape. In a preferred embodiment, where a plurality of plies of green ceramic are laminated into two sides of the open metal structure, two layers of a nickel-based superalloy metal screen with wire having a diameter of about 0.006 inch and a sieve size of 18 mesh are provided.

The optional next step 160, where the optional open metal screen or perforated metal sheet has been provided, is to press the optional open metal screen or perforated metal sheet into the laminated green ceramic layer, such that at least one external side of the optional open metal screen or perforated metal sheet is pressed into the laminated green ceramic layer, with the green ceramic layer being pressed into the shape of the optional open metal screen or perforated metal sheet adjacent to at least one external side. At least one external side of optional open metal screen or perforated metal sheet is preferably substantially parallel to at least one external side of the open metal structure to which the green ceramic layer has been laminated. The optional application step 160 may be performed at a temperature in the range of from about 65° F. (20° C.) to about 300° F. (150° C.) and may be performed by any application means known in the art, such as hand, mechanical press, or roller press. In a preferred embodiment, each of two layers of open nickel-based superalloy mesh is applied at room temperature by hand to each of two laminated stacked plies of green ceramic material positioned on two opposing sides of the open nickel-based superalloy structure. The optional open metallic structure functions as both an erosion surface to protect the underlying ceramic layer from the hot corrosive environment of an engine and as a physical barrier to arrest crack development in the underlying ceramic layer. Additionally, the optional open metal screen or perforated metal sheet provides an excellent surface for applying additional ceramic plies or other ceramic coatings.

The next step of the process 170 is the sintering the ICS precursor material in an oxidative environment to transform the green ceramic material into a ceramic matrix composite material. The ICS precursor material is sintered at a temperature in the range of about 600° C. to about 1100° C. (1100° F.-2000° F.) for a time in the range of about 1 hour to about 8 hours. During the sintering process, at least one external side of the open metal structure to which the ceramic precursor material has been laminated and the inner surfaces of the open metal structure beneath at least one external side which define the aperture shape must form a sufficient amount of metal oxide so that the ceramic produced by the ceramic precursor material chemically bonds to the open metal structure. Optionally, where the optional metal screen has been pressed into the green ceramic layer, at least one external side of the open metal mesh which has been pressed into the green ceramic layer and the inner surfaces of the open metal screen adjacent to at least one external side which define the shape must form a sufficient amount of metal oxide so that the ceramic produced by the ceramic precursor material chemically bonds to the open metal screen. In a preferred embodiment, where there are two layers of green ceramic plies laminated into two substantially opposed external surfaces of an open metal structure, and a layer of open metal mesh have been pressed into each of the stacked plies of the green ceramic plies, the step of sintering 170 will form a substantially continuous ceramic matrix composite such that all three metal elements are bonded to the substantially continuous ceramic matrix composite. Once the ICS precursor material is sintered, it becomes ICS material.

The optional next step of the process 180 is the application of specialized coatings or ceramic composite plies to the sintered ICS material. Examples of these specialized coating include, but are not limited to, coatings such as thermal barrier coatings such as yttrium stabilized zirconia (YSZ) or zirconia ($ZrO_2$) applied by either flame spray or plasma spray, erosion coatings such as zirconia silicates applied by either flame spray or plasma spray, or other heat or electromagnetic coatings applied by any functional method known in the art. Additionally, a ceramic composite prepreg cloth ply can be bonded to the outside surface to provide improve stiffness and environmental protection to the ICS. In a preferred embodiment, no specialized coating or ceramic composite prepreg ply is applied to the surface of the sintered ceramic material.

Figure 2:
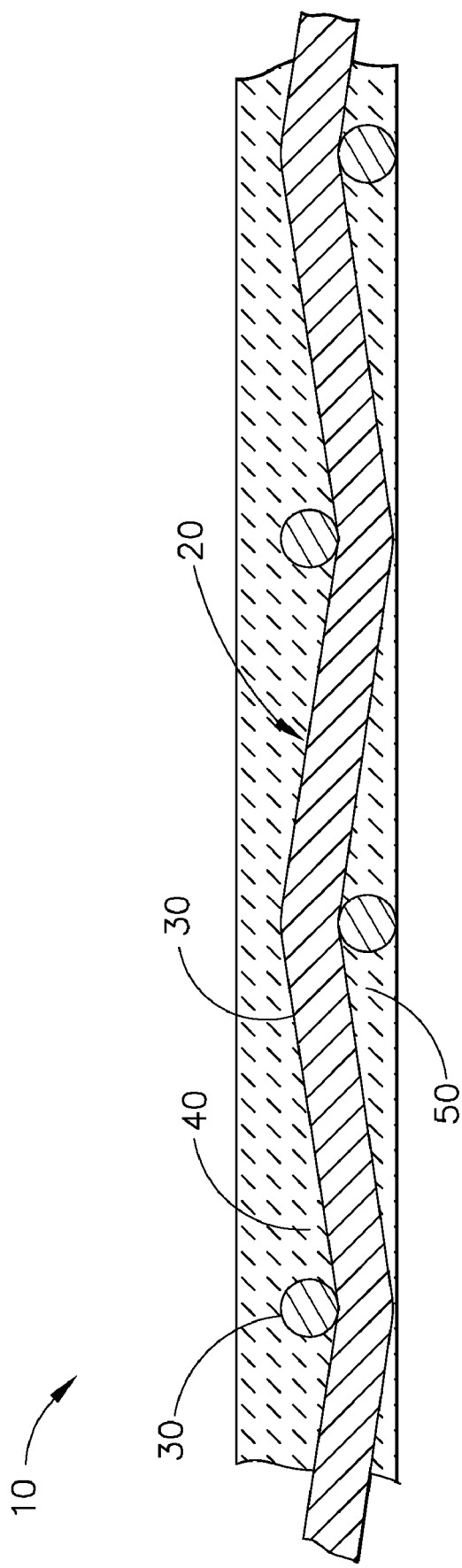
FIG. 2 is a cross sectional view perspective view of the integral composite structural material of the present invention.

Referring now to FIG. 2, a cross-sectional view of the ICS material 10 of the present invention can be seen. The ICS material comprises an open metal structure 20, which comprises a metal framework 30 and a plurality of open shapes 40 within the metal framework. Ceramic matrix composite material 50 is located within at least a substantial number and within at least a portion of the plurality of open shapes 40 and is bonded to the metal framework 30. The total metal volume percent of the metal framework is in the range of about 10% to about 90%, each open shape having no dimension that is greater than about ¾ inch. The metal structure 20 may be in the form of perforated metal or metal wire mesh. If wire mesh is used for the open metal structure, the size of such open metal structure can range from about 0.006 inch diameter wire for high mesh screens such as those for about 16 mesh to about 30 mesh and from about 0.080 inch diameter for lower meshes as those for about 2 to about 6 mesh. The metal framework comprises carbon steel, HSLA steel, stainless steel, aluminum, nickel-based superalloys, iron-based superalloys, cobalt-based superalloys and combinations thereof. The ceramic paper is comprised of oxide fibers, such as NEXTEL® 312 ceramic fibers of NEXTEL® 610 ceramic fibers, silicon carbide fibers, such as TYRANNO FIBER®, glass fibers or combinations thereof. The ceramic matrix between the fibers comprises alumina, silica, zirconia, hafnia, alumina silicate, yttria, calcia aluminate, various clays, and combinations thereof. A layer of ceramic matrix composite 50 also covers at least a substantial portion of at least one external side of the open metal structure 20. In a preferred embodiment, the open metal structure 20 is 4 mesh nickel-based superalloy wire mesh with wire having a diameter of about 0.043 inch, the ceramic matrix composite 50 comprises non-directional chopped alumina fibers in an aluminosilicate matrix, and the ceramic matrix composite is located within all of the shapes 40 and is also bonded to substantially all of both external surfaces on opposite sides of the open metal structure.

In an optional embodiment, in addition to being bonded to the open metal structure 20 the ceramic matrix composite 50 is also bonded to at least one metal screen or thin perforated metal sheet layer comprising aluminum, carbon steel, or iron-based, cobalt-based, or nickel-based superalloys, or combinations thereof. The optional metal screen comprises an open metal mesh structure, which comprises a metal screen framework and a plurality of openings within the metal framework. Ceramic matrix composite material 50 is located within at least a substantial number and within at least a portion of each of the plurality of open screen and is bonded to the metal screen framework. The ceramic matrix composite is also bonded to at least a substantial portion of one external side of the metal screen framework. The ceramic matrix composite is bonded to the optional metal screen such that at least one external side of the optional metal mesh to which the ceramic matrix composite is bonded faces at least one external side of the open metal structure 20. At least one external side of the optional metal screen to which the ceramic matrix composite is bonded is preferably substantially parallel to at least one external side of the open metal structure to which the ceramic matrix composite is bonded. The thermal coefficient of expansion of the material comprising the optional metal screen is selected such that it is within a range such that the expansion of the optional metal mesh does not cause cracks or tears to appear in the ICS material during thermal cycling at higher temperatures. If wire screen is used for the optional metal screen, the size of such wire screen can range from having wire with a diameter in the range of about 0.006 inch to about 0.010 inch with a screen size in the range of about 16 mesh to about 30 mesh. If perforated metal sheet is used for the optional metal screen, the volume percent metal should be low and in the range of about 10% to about 30%. The form of the shapes of the open metal screen must be open so that the shape extends the entire way through the metal, such that the metal has continuous inner surfaces that define the shapes. The optional metal screen also functions as an erosion coat, so that when the optional metal screen is bonded to the ceramic matrix composite 50, no optional erosion coat is required.

In a preferred embodiment, ceramic matrix composite 50 is bonded to both sides of a thin perforated open metal structure 20, as well as substantially all of the internal surfaces of the metal framework 30 which define the openings. A layer of metal mesh having two external sides bonded to the ceramic matrix composite in such a manner that at least one of the external sides of the metal mesh and the external sides of the open metal structure 20 are substantially parallel. In addition, the ceramic matrix composite is only bonded to one side of each optional metal mesh element, is bonded to substantially all of the metal framework of the metal mesh elements which define the metal mesh openings, and occupies substantially all of the metal mesh openings without extending substantially beyond the external surface of the metal mesh elements to which the ceramic matrix composite is not bonded.

Engine components comprised of the ICS material of the present invention have several benefits over other structural materials for use in the high temperature and corrosive environments of turbine engines than do elements composed solely of ceramic matrix composites or metals. The ICS material of the present invention combines the structural strength of metals in its useful temperature regime with the structural strength of ceramics and thermal shock resistance of metals at high temperatures. In addition, the ICS material of the present invention does not have the weaknesses of metals at high temperatures, namely the rapid reduction in modulus of elasticity experienced at high temperatures and the propensity of ceramic matrix composite materials to crack during thermal cycling at higher temperatures. During normal engine operation, engine components experience a significant amount of thermal cycling. During such thermal cycling, ceramic matrix composites tend to develop cracks as the reinforcing fibers in the ceramic matrix composite expand at a different rate than the ceramic matrix surrounding the fibers, the resulting thermal stresses exceeding the ultimate tensile stress of the matrix, resulting in cracks or fissures. Often, such cracks readily propagate through the ceramic matrix composite causing failure during engine operation. While the ICS material of the present invention cannot prevent cracks from forming in the ceramic matrix composite 50 bonded within the openings 40 of the open metal structure 20, such cracks will not propagate into the metal, since metal is inherently resistant to such crack development, and arrests the crack formed in the ceramic matrix or into the ceramic matrix composite material 50 located within the other openings 40 of the open metal structure 20.

In addition to arresting crack propagation, in particular, continuous crack propagation within the ceramic matrix composite material 50, the present invention provides a way to tell whether the ICS material is nearing a point of failure. With engine components composed solely of ceramic matrix composite materials, little creep deformation occurs prior to failure of the component typically less than 0.5%. However, metal components typically show a significant amount of creep deformation prior to component failure. Components manufactured from the ICS material of the present invention can elongate over about 2 percent to about 2.5 percent prior due to creep prior to failure. Such elongation is a readily apparent sign that a component comprised of the ICS material of the present invention is nearing failure.

In addition to providing operational benefits, the ICS material also provides an additional benefit of being able to be easily fastened to a metal component or an ICS component. Since the ICS material of the present invention comprises an open metal structure, the ICS material can be mechanically fastened, such as by bolting, spacers can be used, and the ICS material can be welded to other metal components or ICS components. With components composed of ceramic matrix composites, bolting generally results in large cracks in the ceramic matrix composite material and welding is impossible due to the lack of metal in ceramic matrix composites.

In another embodiment of the present invention specialized coatings are applied to the outside surface of the ICS to enhance the performance of the component. These coatings include: (1) thermal barrier coatings to increase the thermal durability and temperature capabilities of the ICS; (2) erosion and wear coatings to increase the mechanical and environmental durability; and (3) other heat or electromagnetic coatings to limit thermal and electromagnetic reflections.

EXAMPLE 1

In an investigation leading up to this invention, an ICS material was formed using a thin sheet of aluminum metal perforated sheet with evenly spaced apertures, the sheet having a total porosity of about 25%. The aluminum perforated sheet was sandwiched between one ply of NEXTEL® 312 paper, which is a well known proprietary ceramic comprising non-directional alumina-silica-boria fibers, which was previously prepregged with an aluminosilicate-yielding matrix, laminated at a pressure of about 200 psi, at a temperature of about 300° F. (150° C.) for a time of about 30 minutes, and was then sintered at a temperature of about 1100° F. (590° C.) for a time of 4 hours. A static load was applied to a 1-inch wide aluminum ICS specimen as well as to 4 stacked 1 inch wide perforated aluminum plates, such that the thickness of the 4 stacked plates was substantially equal to the thickness of the aluminum ICS specimen. The static load was applied normal to the 1-inch width of the ICS specimen. The specimens were placed in a furnace under the load and gradually heated until 2% deformation in the specimen was obtained. The aluminum ICS had a thermal load carrying capacity about 285° F. (140° C.) greater than the 4 stacked perforated aluminum sheets.

EXAMPLE 2

In an investigation leading up to this invention, an ICS material was formed using a #3 mesh carbon steel wire mesh having a wire diameter of about 0.080 inch. The steel mesh was sandwiched between 6 plies of NEXTEL® 610 paper, which is a well known proprietary ceramic comprising non-directional alumina, which was previously prepregged with an aluminosilicate-yielding matrix, laminated at a pressure of about 200 psi, at a temperature of about 300° F. (150° C.) for a time of about 30 minutes, and was then sintered at a temperature of about 1650° F. (900° C.) for a time of about 4 hours. Three plies of the NEXTEL® 610 paper were placed on opposite sides of the mesh. A thermal cycling test was performed on the ICS material and excellent thermal cycling resistance was shown above about 2200° F. (1205° C.). The thermal cycling test consisted of inserting about ¾ inch of an edge of the ICS specimen through a slot in a heated furnace, letting the specimen soak for a time greater than about 2 minutes and then quickly removing the ICS specimen and blowing room temperature air on the edge. Some cracking was observed in the ceramic matrix composite after a thermal cycle test at about 2200° F. (1205° C.), but the cracks in the ceramic matrix composite did not extend beyond the wire in the wire mesh.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of manufacturing an integral composite structural material for use in turbine engine components comprising the steps of:

(a) providing an open metal structure having inner surfaces of metal defining a plurality of apertures that extend entirely through the metal structure such that the apertures have continuous inner surfaces and at least one external side, said metal structure being selected from the group consisting of aluminum, high strength low alloy steel, stainless steel, carbon steel, nickel-based superalloys, iron-based superalloys, and cobalt-based superalloys, said apertures having a geometry such that no dimension of said apertures is greater than about ¾ inch, wherein the total metal volume percent of the integral composite structural material, exclusive of ceramic matrix composite precursor material, is in the range of about 10% to about 90%;

(b) providing a prepreg ceramic paper of ceramic matrix composite precursor material, wherein the ceramic matrix composite precursor material further includes ceramic fibers and ceramic matrix material, wherein the ceramic fibers are selected from the group consisting of alumina fibers, silica fibers, boric oxide fibers, silicon carbide fibers, glass fibers, and combinations thereof, and wherein the ceramic matrix material is selected from the group consisting of zirconia, hafnia, alumina silicate, yttria, calcia aluminate, clay and combinations thereof;

(c) applying the prepreg ceramic paper of ceramic matrix composite precursor material to the open metal structure by pressing the prepreg ceramic paper onto at least one external side of the open metal structure and into the plurality of apertures of the open metal structure;

(d) laminating the prepreg ceramic paper to the open metal structure so that the ceramic matrix composite precursor material is disposed on and within the apertures and wherein the ceramic matrix composite precursor material occupies and covers the inner surfaces of the open metal structure and the laminated ceramic matrix composite precursor material and open metal structure form an integrated composite structural precursor material; and (e) sintering the laminated ceramic matrix composite precursor material in an oxidative environment at a temperature in the range of about 600° C. to about 1100° C. to transform the ceramic matrix composite precursor material into a ceramic matrix composite material adapted for use in turbine engine components, said ceramic matrix composite material being chemically bonded to the at least one external side and said inner surfaces of the open metal structure, which transforms the integral composite structural precursor material into the integral structural composite material adapted for use in turbine engine components.

2. The method of manufacturing an integral composite structural material of claim 1 wherein the open metal structure has been pre-oxidized, prior to the step of applying the prepreg ceramic paper of ceramic matrix composite precursor material to the surface of the at least one external side of the open metal structure.

3. The method of method of manufacturing an integral composite structural material of claim 2 further comprising the additional step of applying a coating to the integral composite structural material, the coating being selected from the group consisting of yttrium stabilized zirconia and zirconia, the coating being applied by a method selected from the group consisting of flame spray and plasma spray.

4. The method of manufacturing an integral composite structural material of claim 1, further comprising an additional step, prior to the step of applying, of roughening the surface of at least one external side of the open metal structure and the inner surfaces of the open metal structure, removing any residual surface oxides from at least one external side of the open metal structure and the inner surfaces of the open metal structure, and combinations thereof.

5. The method of method of manufacturing an integral composite structural material of claim 4 further comprising the additional step of applying a coating to the integral composite structural material, the coating being selected from the group consisting of yttrium stabilized zirconia and zirconia, the coating being applied by a method selected from the group consisting of flame spray and plasma spray.

6. The method of manufacturing an integral composite structural material of claim 1, further comprising an additional steps, prior to the step of sintering of:
  (a) providing at least one additional open metal structure selected from the group consisting of an open metal screen and a perforated metal sheet, wherein the open metal screen has wire with a diameter in the range of about 0.006 inch to about 0.010 inch, and wherein the screen size is in the range of about 16 mesh to about 30 mesh, and wherein the perforated metal sheet has a total metal volume percent of the integral composite structure material, exclusive of ceramic matrix composite precursor material, in the range of about 10 percent to about 30 percent; and
  (b) pressing the at least one additional open metal structure into the laminated ceramic matrix composite precursor material.

7. The method of method of manufacturing an integral composite structural material of claim 6 further comprising the additional step of applying a coating to the integral composite structural material, the coating being selected from the group consisting of yttrium stabilized zirconia and zirconia, the coating being applied by a method selected from the group consisting of flame spray and plasma spray.

8. The method of method of manufacturing an integral composite structural material of claim 1, further comprising the additional step of bonding a ceramic composite cloth ply pre-impregnated with a matrix precursor to the integral composite structural material after the step of sintering.

9. The method of method of manufacturing an integral composite structural material of claim 1, further comprising the additional step of applying a coating to the integral composite structural material, the coating being selected from the group consisting of yttrium stabilized zirconia and zirconia, the coating being applied by a method selected from the group consisting of flame spray and plasma spray.

* * * * *